United States Patent [19]

Morita

[11] 4,229,983
[45] Oct. 28, 1980

[54] BALL-AND-SCREW POWER TRANSMISSION DEVICE

[75] Inventor: Masayasu Morita, Fuchu, Japan

[73] Assignee: France Bed Co., Ltd., Tokyo, Japan

[21] Appl. No.: 891,287

[22] Filed: Mar. 29, 1978

[51] Int. Cl.² ............ F16H 27/02; F16H 29/02; F16H 29/20
[52] U.S. Cl. .................. 74/89.14; 74/424.8 NA
[58] Field of Search ......... 74/89.14, 89.15, 424.8 NA, 74/499, 459

[56] References Cited

U.S. PATENT DOCUMENTS

| | | | |
|---|---|---|---|
| 594,741 | 11/1897 | Harwood | 74/459 X |
| 2,472,002 | 5/1949 | Clark | 74/459 X |
| 2,718,165 | 9/1955 | Bourassa et al. | 74/424.8 NA |
| 2,795,149 | 6/1957 | Morris | 74/424.8 NA |
| 2,803,146 | 8/1957 | Brundage | 74/424.8 NA |
| 3,029,792 | 4/1962 | Rasmussen | 74/89.15 X |
| 3,062,070 | 11/1962 | Beatty et al. | 74/499 X |
| 3,269,199 | 8/1966 | Deehan et al. | 74/89.15 |
| 3,771,383 | 11/1973 | Fofster et al. | 74/499 |
| 4,131,029 | 12/1978 | Harbaugh et al. | 74/89.15 |

FOREIGN PATENT DOCUMENTS

| | | | |
|---|---|---|---|
| 450824 | 8/1948 | Canada | 74/424.8 NA |
| 28-453 | 5/1953 | Japan | |
| 513096 | 10/1939 | United Kingdom | 74/424.8 NA |
| 1066227 | 4/1967 | United Kingdom | 74/459 |
| 382084 | 10/1973 | U.S.S.R. | 74/424.8 NA |

OTHER PUBLICATIONS

Roton Antifriction Bearing Screw, 1958, last page only.

Primary Examiner—Leslie Braun
Attorney, Agent, or Firm—Frishauf, Holtz, Goodman & Woodward

[57] ABSTRACT

A ball-and-screw power transmission device includes a screw or a threaded rod on which power to be transmitted is applied, an outer cylindrical member disposed around the screw, and at least one ball or spherical member located in contact between the adjacent turns of the thread on the screw and the inner wall surface of the outer cylindrical member, the rotational power being thus transmitted through the ball to the outer cylindrical member as a converted linear power. Means is further provided to restrain behavior of the ball during the inverse-directional and the forward-directional operations of the device relative to the direction of a load for automatically changing a reduction ratio between the two operations.

2 Claims, 6 Drawing Figures

BALL-AND-SCREW POWER TRANSMISSION DEVICE

BACKGROUND OF THE INVENTION

This invention relates to a power transmission device having a combined arrangement of balls and a screw for converting rotary to linear motion.

A variety of devices of the class have been known as circulatory fixed or other types. Any of the known devices operates to transmit power at a substantially equal reduction ratio in both directions counter to and toward the directions which a load is exerted (hereinafter called "counter-directional and non-counter-directional operation", respectively), so that a fairly great part of the work is rendered ineffective. The disadvantage of a loss of work is obvious particularly when such a transmission device is utilized to transmit power from a source for actuating movable elements in a reclining lounge, a jack or any other like appliances where the movable elements have to be actuated under a different load.

SUMMARY OF THE INVENTION

An object of the invention is to provide a ball-and-screw power transmission device having an arrangement which, without any elements being manipulated, is capable of automatically changing a reduction ratio so that the latter is great upon the inverse-directional operation while the same is small upon the forward-directional operation, thus substantially eliminating an ineffective amount of work.

Another object of the invention is to provide a ball-and-screw power transmission device capable of being rendered ineffectual automatically when the device has operated to a full stroke.

A ball-and-screw power transmission device is provided according to the invention which comprises elongated screw means provided with at least one thread, at least one spherical member disposed between the adjacent turns of said thread, a sleeve in which said spherical member is supported, and an outer cylindrical member disposed to surround said sleeve and having an inner wall surface with which said spherical member is in contact, and friction means disposed to be in contact with said sleeve upon axial displacement of the latter to frictionally restrain rotation of said sleeve relative to said outer cylindrical member.

DESCRIPTION OF THE PREFERRED EMBODIMENTS

Figure 1:
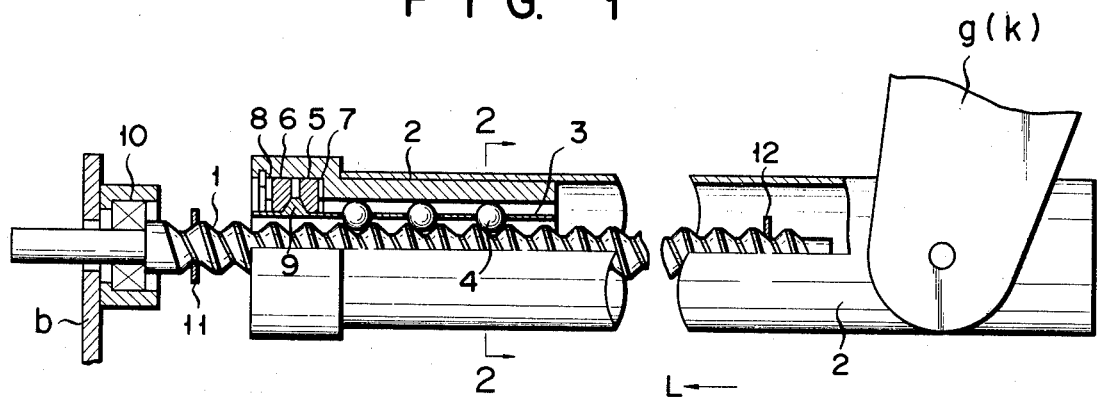
FIG. 1 is a side view of a ball-and-screw power transmission device embodied by the invention with parts shown partially in section.
Figure 2:
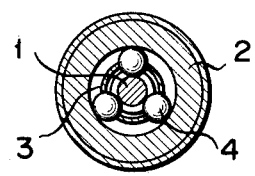
FIG. 2 is a cross-sectional view taken along line 2—2 of FIG. 1.

A ball-and-screw power transmission device embodied by the invention is shown in FIGS. 1 and 2 and includes a screw or threaded shaft 1 extending longitudinally through an outer hollow cylindrical member 2. The hollow cylindrical member 2 has a smooth, cylindrical interior wall. Coaxially between the interior wall of hollow cylindrical member 2 and the periphery of the screw 1 disposed is a sleeve 3 having a plurality of perforations in each of which a ball or a sphere 4 is rotatably supported in contact with the interior wall of hollow cylindrical member 2 on one hand and opposite side surfaces of adjacent turns of threads on the periphery of the screw 1 on the other hand. Outer hollow cylindrical member 2 is provided on an inner wall at one end with a pair of friction annuli or rings 5 and 6 which are not rotatable relative to outer hollow cylindrical member 2, but slightly movable in the longitudinal axial direction of the latter. The sleeve 3 is also provided at the corresponding end to the friction annuli 5 and 6 with a peripheral flange 9 which is placed between the pair of friction annuli or rings 5 and 6. The friction annuli 5 and 6 are lightly urged into contact with laterally opposed sides of the peripheral flange 9 of sleeve 3 by means of a pair of spring washers or the like 7 and 8.

Screw 1 extends beyond the end portions of outer cylindrical member 2 and sleeve 3 to be rotatably journaled at a bearing 10 rigidly disposed on a base b. Rotational power input means or a crank knob (not shown) is connected with the end of screw 1 protruding from the bearing 10. An output link g is connected with outer cylindrical member 2 at the opposed end portion to the above mentioned end. A pair of stoppers 11 and 12 are disposed on screw 1, one stopper 11 being disposed at one end in the outside of outer cylindrical member 2 between the end portion of the latter and the screw bearing 10 and another 12 being disposed at the opposed end in the inside of outer cylindrical member 2.

In operation, supposing that a load L is exerted in a direction of the arrow L in FIG. 1, the load, compressing spring washer 7, is transmitted to friction annulus 5 which is thereby pressed onto flange 9 to transmit the load to sleeve 3. Thus, the load is transmitted through balls 4, screw 1 and bearing 10 finally to base b.

In the course of the load transmission, the balls 4 are applied with a force which cause the balls to tend to dislodge the balls from the opposed side surfaces of adjacent thread turns on screw 1 in a radial direction of the latter so that the balls 4 are urged against the inner wall surface of outer cylindrical member 2. This means that a portion of the load is transmitted by the frictional action between outer cylindrical member 2 and balls 4 in the path of the outer cylindrical member, balls and screw.

The above stated frictional action will be explained further in detail with reference to FIG. 3 in which ball 4 is in contact with the side surface of the thread at point $P_1$, with the inner surface wall of outer cylindrical member 2 at point $P_2$, and with sleeve 3 at portion $P_3$. Since the ball, while having point contacts at points $P_1$ and $P_2$, has a surface contact at portion $P_3$ where a sufficiently great contact area is involved to prevent the oil layer from being destroyed, a frictional force at portion $P_3$ is substantially smaller than in points $P_1$ and $P_2$.

Figure 3:
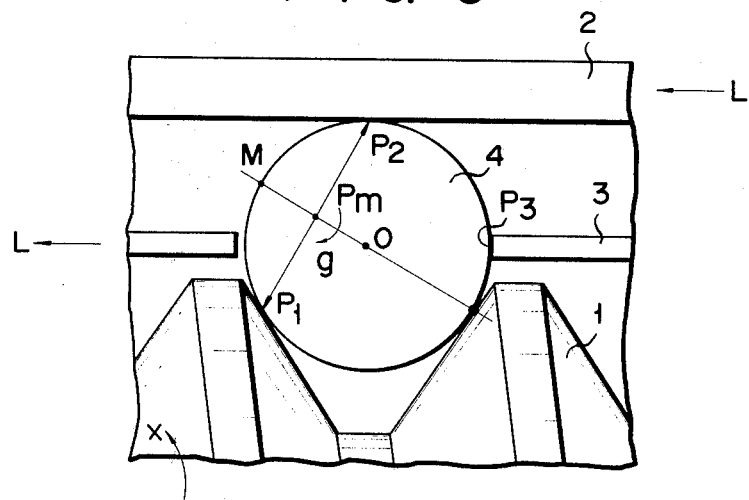
FIG. 3 is a schematical view of the ball incorporated in the device of FIG. 1.

When a rotational force is applied to screw 1 to rotate the latter in a direction of Arrow x of FIG. 3 for an inverse-direction operation of the device, the balls 4 are applied with a force which causes the latter to tend to rotate on their axes, in addition to the forces present in the balls 4 at rest as above stated. Since a frictional force exerted on balls 4 at portion $P_3$ is smaller than enough to be at the time restricted in a direction therefrom toward center 0 of balls 4, a force tending to rotate balls on their axes is exerted exclusively in the form of frictional forces at points $P_1$ and $P_2$, which are a couple of forces whose center falls on the median Pm on a line passing through $P_1$ and $P_2$. Therefore, balls are caused to rotate about a diameter passing through the median Pm in a direction of Arrow g of FIG. 3.

Figure 4:
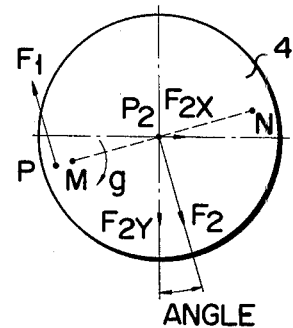
FIG. 4 is a schematical view of the ball of FIG. 3 for explaining the behavior of the ball.

An upperside view of the ball 4 of FIG. 3 is shown in FIG. 4 in which a force caused by the above rotational force to be exerted at point $P_2$ from the balls to the outer cylindrical member 2 is shown at $F_2$. Force $F_2$ has an angle relative to the peripheral direction normal to the axial direction of the screw and therefore is resolved to a axial-directional and a peripheral-directional components $F_{2x}$ and $F_{2y}$. The latter or the peripheral-directional force $F_{2y}$ reactively generates a force for rotating the ball in the peripheral direction while guided in the sleeve perforations. The former or the axial-directional force $F_{2x}$ has a counter direction to the direction in which the load L is exerted on outer cylindrical member 2, or has a direction cancelling the load L. Screw 1 is urged at point $P_1$ reactively by the axial-directional force $F_{2x}$ in the same direction as that of the load L. This results in bringing the balls 4 almost substantially into engagement with outer cylindrical member 2 and screw 1 whereby the load L transmitted through sleeve 3 is transmitted directly from outer cylindrical member 2 by the intermediary of balls 4 to screw 1, so as to reduce a pressing or frictional force Tf applied to flange 9 from friction annulus 5 which is urged by the load L.

As the rotational force f on screw 1 becomes greater, the components $F_{2x}$ and $F_{2y}$ of force $F_2$ are increased in proportion.

Thus, increase of component $F_{2x}$ gradually reduces frictional force Tf applied by friction annulus 5 to flange 9 until Tf becomes smaller than $F_{2x}$ so that $F_{2y}$ then overcomes Tf thereby to rotate the balls about the screw axes together with sleeve 3. During the rotation together with sleeve 3 about the screw axes, balls 4 behave like planetary gears to that a theoretical reduction ratio then presented by the device is equivalent to that presented by a similar power transmission device having sleeve 3 non-rotatably rigid with outer cylindrical member 2, or in other words can be expressed by:

$$N = 1 + \frac{\text{pitch diameter of screw 1}}{\text{inner diameter of outer cylindrical member 2}}$$

But, the reduction ratio actually achieved does not precisely but approximately falls on the above defined value because of the balls 4 being permitted to slide somewhat but to an insignificant degree out of engagement between member 2 and screw 1.

Upon a forward-directional operation of the device, screw 1 and balls 4 are rotated in directions which are opposed to the above stated ones, to produce the corresponding forces exerted on the balls, but all in inverse directions so that a reactive force of the component $F_{2x}$ at point $P_2$ lies in a direction which results in increase of the pressing force on flange 9, thereby to bring sleeve 3 substantially into a non-rotatable fixed state when the reduction ratio of the device is reduced to about 1/N in comparison with that for the above described inverse-directional operation.

As above stated, the stoppers 11 and 12 are provided at the opposite ends of screw 1 to define the stroke of the latter. Thus, when the stopper 11 or 12 becomes abutting against one of the opposite end surfaces of sleeve 3 after the inverse-directional or the forward-directional operations, the balls 4 do not make a rotation about the screw axis any further so that the power transmission is rendered ineffectual. If a rotational power is kept applied to screw 1 after excursion of the screw 1 through the defined distance of stroke, the screw is therefore not permitted to make any more linear movement, thus avoiding any breakage without any caution paid to the time of termination of the screw excursion for both directional operations.

It is evident from the foregoing that the ball-and-screw power transmission device is automatically permitted to have a great reduction ratio upon the inverse-directional operation and a small reduction ratio upon the forward-directional operation.

A wide range of fields are obvious to one skilled in the art in which the device of the invention can be utilized. A reclining lounge with the device of the invention incorporated therein will be described by way of example with reference to FIGS. 5 and 6.

Figure 5:
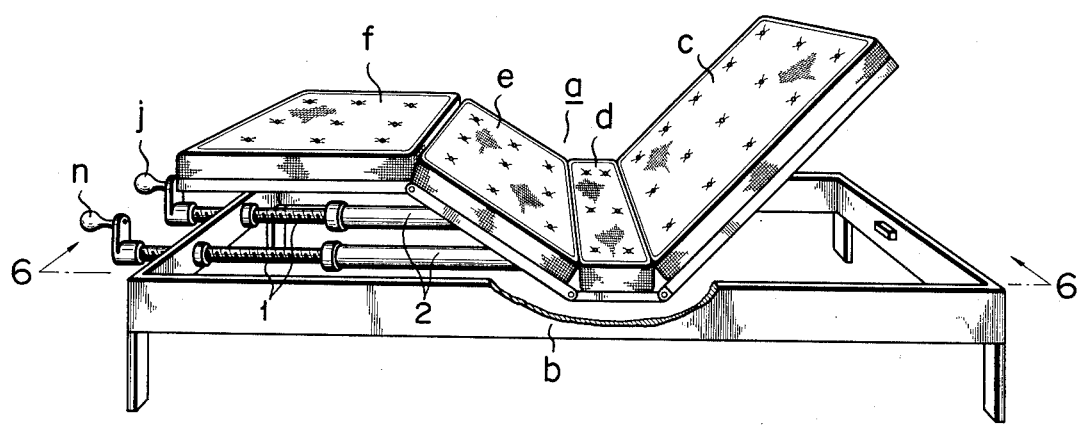
FIG. 5 is a perspective view, with part broken, of a reclining lounge having the ball-and-screw power transmission device of the invention incorporated therein.
Figure 6:
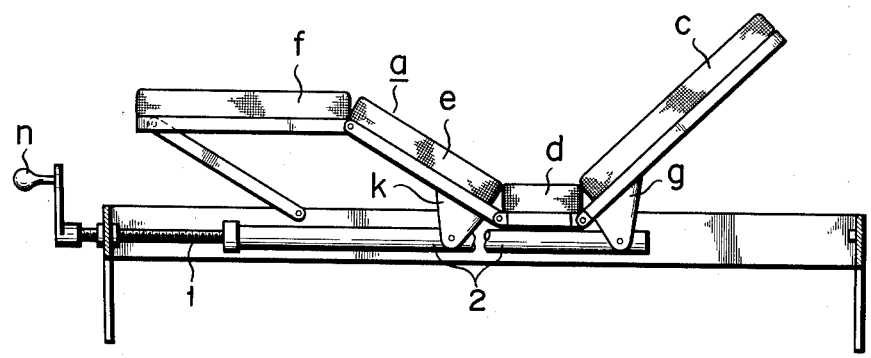
FIG. 6 is a sectional view taken along line 6—6 of FIG. 5.

Referring to FIG. 5, a mattress a is disposed on a base frame b and is formed by sections c, d, e and f on which when the user lies on the mattress, the back, the hips, the thighs, and the legs are located, respectively, each section being turnably hinged with each other. A pair of the ball-and-screw power transmission devices of the invention are supported transversely in one short side member of the base frame b adjacent the proximal end to extend longitudinally along long side members of frame b. The power transmission devices each have an end portion protruding outwardly from the supporting short side member of the base frame b where manually operating handles n and f are provided.

A first crank g is, on one hand, rigid with the back section c of mattress a at its rear side and, on the other hand, connected turnably with the periphery of the outer cylindrical members 2 of one of the power transmission devices. A second crank k is similarly rigid with the thighs section e of mattress a and turnably connected with the periphery of the outer cylindrical member 2 of the other power transmission device.

When the user lies on the flattened sectional mattress a, manual turning on the handles j and n of the one and the other power transmission devices, respectively, actuates the back section c, and the thighs and the legs sections e and f of mattress a to be pivotally raised as shown. The power transmission devices are then operated in the counter direction to load or in other words make the inverse-directional operation during which their reduction ratio is increased whereby a manual turning force is substantially reduced which is required on the handles for the rising actuation of the reclining lounge into a sit-up posture.

Conversely, when the reclining lounge is actuated to return from the sit-up posture to a flattened posture, the power transmission devices will operate in a direction to which load is exerted or in other words will make the forward-directional operation with a reduced reduction ratio whereby the reclining lounge may be comparatively rapidly actuated into the flattened posture.

It is understood from the foregoing description that the ball-and-screw power transmission device of the invention which, without any separate, ad hoc means provided, is capable of changing a reduction ratio between the inverse-directional and the forward-directional operations is significantly of utility in application to a reclining bed and the like.

The embodiments have been described in the foregoing merely by way of example and may be modified unless falling outside of the scope and spirit of the invention. For instance, the screw or the threaded shaft of the device may be provided with a plurality of, instead of single, threads. Further, the plurality of balls 4 may be replaced by one spherical member.

What is claimed is:

1. A ball-and-screw power transmission device operable in non-counter and counter directions, comprising:
    elongated screw means provided with at least one thread;
    at least one spherical member disposed in between the adjacent turns of said thread;
    a sleeve in which said at least one spherical member is supported;
    an outer cylindrical member surrounding said sleeve and having an inner wall surface with which said at least one spherical member is in contact; and
    friction means disposed to be in contact with said sleeve upon axial displacement of said sleeve to frictionally restrain rotation of said sleeve relative to said outer cylindrical member when said sleeve is axially displaced, said friction means including a pair of friction rings disposed in said outer cylindrical member and being non-rotatable relative to said outer cylindrical member, said friction rings being biased toward each other and being movable in the axial direction of said outer cylindrical member;
    said sleeve having an integrally formed flange positioned between said friction rings of said friction means;
    said at least one spherical member revolving while rotating around said screw means jointly with said sleeve during non-counter-direction operation of said transmission device, and said at least one member and said sleeve abutting to be fixed relative to said outer cylindrical member by means of said friction means when said sleeve is axially displaced during counter-direction operation of said transmission device.

2. The ball-and-screw power transmission device according to claim 1 comprising at least one spring washer bearing on at least one of said friction rings for biasing said at least one friction ring toward the other friction ring.

* * * * *